Patented Jan. 3, 1939

2,142,537

UNITED STATES PATENT OFFICE 2,142,537

ANESTHETIC OINTMENT

Edmond T. Tissa, Yonkers, N. Y., assignor to Rare Chemicals, Inc., Nepera Park, N. Y., a corporation of New York No Drawing. Application July 22, 1936, Serial No. 91,912

5 Claims. (Cl. 167—52)

This invention relates to an anesthetic ointment without initial irritation.

It is highly desirable in severe cases of sunburn, pruritus, eczemas, hemorrhoids, etc. to use an anesthetic ointment to relieve the pain and itching. The ointment should also have antiseptic value to prevent infections by pus forming organisms.

One substance having these properties, i. e. a high bactericidal action and an anesthetic action effective for several hours is isoamylhydrocupreine or its salts. However, this substance has not been used for this purpose since, when applied to mucous membranes, open sores, or wounds, it causes irritation and smarting.

The irritation caused by the use of isoamylhydrocupreine or its salts in ointment form lasts only until its anesthetic properties take effect on the nerve ends. This nevertheless is sufficient to discourage its use.

It has been found, however, that combining another substance, having a quick acting anesthetic effect, with the isoamylhydrocupreine, the undesirable properties or characteristics of the latter will be overcome, but the lasting anesthetic and high bactericidal value of the isoamylhydrocupreine or its salts will be retained. This invention has for its object, therefore, to provide an anesthetic and antiseptic ointment having instant and also prolonged anesthetic action without initial irritation.

Another and more specific object of the invention is to provide an isoamylhydrocupreine ointment having instant and also prolonged anesthetic action without initial irritation.

Another object of the invention is to provide a method or methods of combining the components and compounding an ointment of the character described.

Further objects of the invention will appear from the following specification.

The invention briefly described consists of an antiseptic and anesthetic ointment so constituted that it will have instant and also prolonged anesthetic action. More specifically stated, the invention consists of an isoamylhydrocupreine ointment having as a component a quick acting local anesthetic, such as an alkylparaminobenzoate, to overcome the normal initial irritation due to isoamylhydrocupreine.

Further details of the invention will appear from the following description.

The ointment base may be prepared like simple ointment U. S. P., or it may be of the non-greasy type. The following examples are given to indicate some of the modes of procedure that may be used in making up the ointment having the desired characteristics.

Example 1.—5 grams anhydrous lanum, 5 grams white beeswax, and 88 grams petrolatum are melted together at 60° C. 1 gram isoamylhydrocupreine and 1 gram propylparaminobenzoate are triturated with part of the molten ointment base and added to the balance. The entire ointment is kept at the above temperature until it forms a clear solution. After cooling, the ointment is ready for use.

Example 2.—5 grams anhydrous lanum, 5 grams white beeswax, and 88 grams petrolatum are melted together at 60° C. 1 gram isoamylhydrocupreine dihydrochloride and 1 gram n-butylparaminobenzoate is triturated with part of the molten ointment and added to balance. The ointment is now cooled under constant stirring and same is ready for use when cooled down to room temperature.

Example 3.—32.5 grams anhydrous lanum, 22.5 grams petrolatum, 15 grams glycol stearate is melted together in a porcelain dish on a steam bath by heating to about 60° C. and 1 gram isoamylhydrocupreine and 1 gram ethylparaminobenzoate are dissolved in the mixture while hot. After a clear solution is obtained 28 grams distilled water, previously heated to 60° C., is added to the above. The ointment is now cooled under constant, fast stirring to room temperature and is ready for use.

Example 4.—32.5 grams anhydrous lanum, 22.5 grams petrolatum, and 15 grams glycol stearate are melted together in a porcelain dish on a steam bath by heating to about 60° C. and 1 gram ethylparaminobenzoate is dissolved in the mixture while hot. Then 1 gram isoamylhydrocupreine dihydrochloride is dissolved in 28 grams distilled water, previously heated to 60° C., and added to the above. The ointment is now cooled under constant, fast stirring to room temperature and is ready for use.

Although all of the products obtained by the procedures above outlined are effective, that described in Example 3 is preferred. The procedure outlined forms a cream colored ointment which is easily absorbed when spread on the skin or mucous membranes. This ointment instantly relieves pain or itching of burns or open wounds without causing the least irritation. Clinical tests have shown that it produces a prolonged anesthesia and is of great value after rectal operations, particularly as the rectal wounds are subject to contamination. The ointment has also proved to be valuable in making proctological examinations where it is used to lubricate the instruments particularly in cases where the examinations are almost impossible because of excruciating pain.

Because of the relatively low toxicity of isoamylhydrocupreine or its salts this ointment may be used for covering large areas of the body, therefore, it can be used safely and effectively for the relief of pain in severe cases of burns and sunburns.

It is obvious that other instantly acting local anesthetics than those mentioned may be used to counteract the irritating action of isoamylhydrocupreine or its salts without departing from the spirit or scope of the invention and it should be understood that no other limitations are intended other than those imposed by the appended claims.

What I claim is:

1. An isoamylhydrocupreine ointment having combined therein ethylparaminobenzoate in an amount sufficient to overcome the normal irritating action of the isoamylhydrocupreine.

2. An isoamylhydrocupreine ointment having combined therein n-butylparaminobenzoate in an amount sufficient to overcome the normal irritating action of the isoamylhydrocupreine.

3. An antiseptic and anesthetic ointment comprising an alkylparaminobenzoate having a quick acting local anesthetic action and isoamylhydrocupreine having a prolonged anesthetic action, the alkylparaminobenzoate being combined with the isoamylhydrocupreine in an amount sufficient to overcome the initial irritating action of the isoamylhydrocupreine.

4. An isoamylhydrocupreine ointment having combined therein propylparaminobenzoate in an amount sufficient to overcome the normal irritating action of the isoamylhydrocupreine.

5. An isoamylhydrocupreine ointment having combined therein an alkylparaminobenzoate in an amount sufficient to overcome the normal irritating action of the isoamylhydrocupreine.

EDMOND T. TISZA.